United States Patent
Boda

[11] 4,024,851
[45] May 24, 1977

[54] TRIPOD COOKING DEVICE

[76] Inventor: Robert A. Boda, 4405 James Road, Rte. 3, Oshkosh, Wis. 54901

[22] Filed: May 19, 1975

[21] Appl. No.: 578,641

[52] U.S. Cl. .................... 126/30; 126/9 R; 248/165
[51] Int. Cl.² .......... A47J 37/00; F24B 3/00; F24C 1/16
[58] Field of Search .......... 126/30, 29, 9 R, 25 A, 126/25 R, 9 B; 248/165, 166, 168, 328; 99/449

[56] References Cited

UNITED STATES PATENTS

| | | | |
|---|---|---|---|
| 1,311,302 | 7/1919 | Turner et al. | 126/30 X |
| 2,113,134 | 4/1938 | Godfrey | 248/328 |
| 2,466,496 | 4/1949 | Smith | 126/30 X |
| 2,828,097 | 3/1958 | Faunce | 248/328 X |
| 2,839,043 | 6/1958 | La Born | 126/30 |
| 3,152,536 | 10/1964 | Lucas | 126/30 X |
| 3,636,938 | 1/1972 | Faltersack | 126/30 |
| 3,785,360 | 1/1974 | Martin | 126/30 |
| 3,898,980 | 8/1975 | Reimann | 126/30 X |

FOREIGN PATENTS OR APPLICATIONS

| | | | |
|---|---|---|---|
| 856,361 | 7/1949 | Germany | 248/168 |
| 80,152 | 2/1919 | Switzerland | 126/30 |

*Primary Examiner*—William F. O'Dea
*Assistant Examiner*—Harold Joyce
*Attorney, Agent, or Firm*—Andrus, Sceales, Starke & Sawall

[57] ABSTRACT

A tripod cooking device is of the pyramidal tripod type and contemplates utilization of a grill which hangs from the tripod apex and which is easily assembled and disassembled. One of the tripod legs is larger in diameter than the others and is adapted to storingly receive all of the other components of the device. In addition, the said larger leg is formed at one end to have multi-functions, i.e. (1) it provides a guide for the grill hanging cable; (2) it provides a stop for the other tripod legs when the unit is assembled; and (3) it provides a stop to prevent fall-out of all the other components when they are stored therein. Furthermore, a wind guard is provided which selectively protects one lower side of the apparatus or alternately all three upper sides thereof.

8 Claims, 14 Drawing Figures

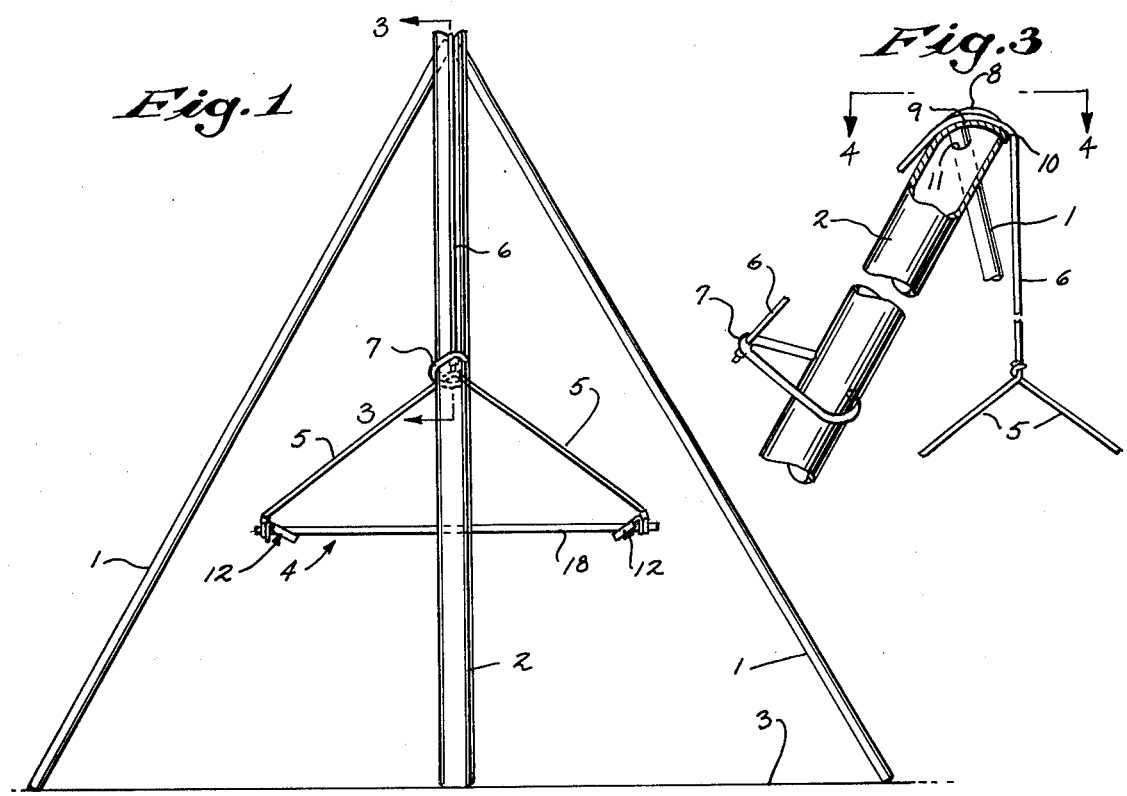
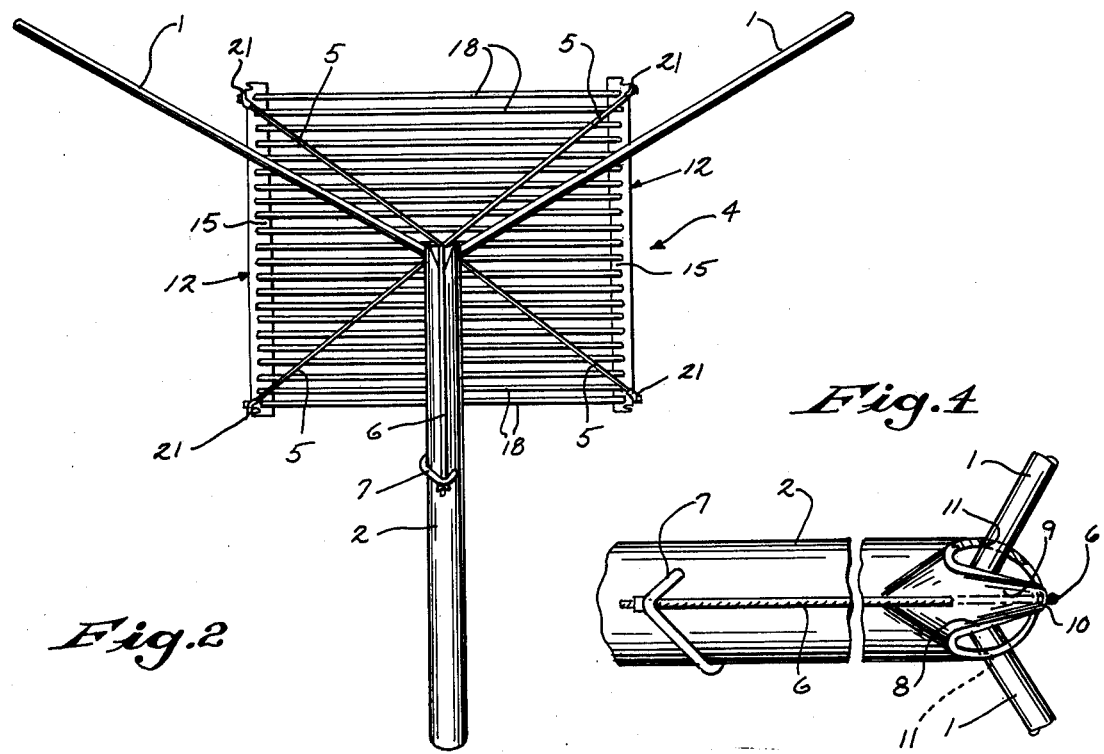

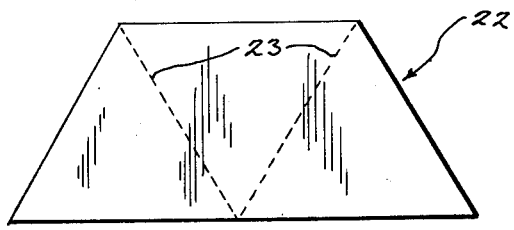
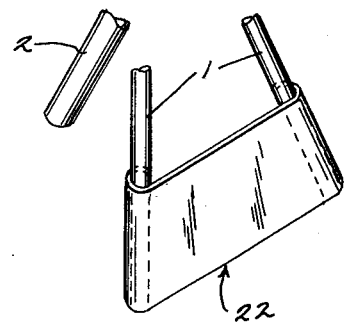
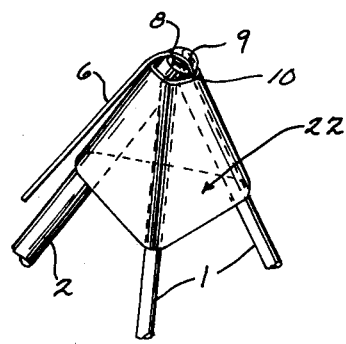
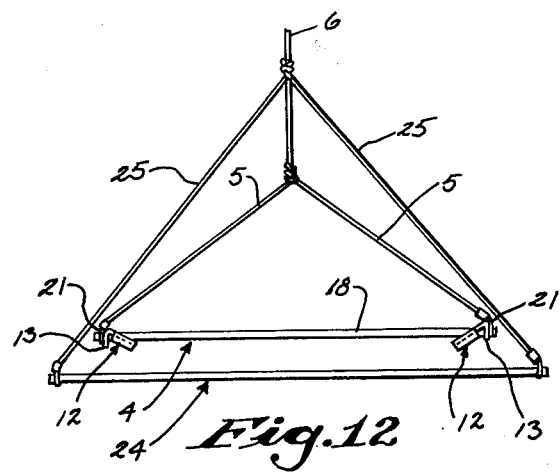
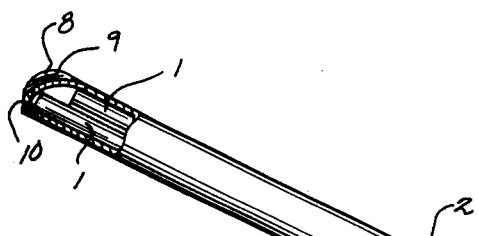
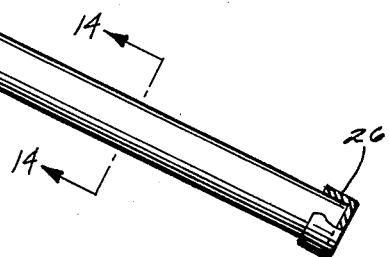
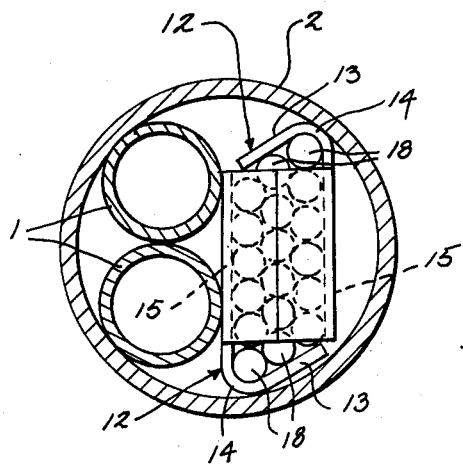

TRIPOD COOKING DEVICE

U.S. PRIOR ART OF INTEREST

| U. S. Prior Art of Interest | | |
| --- | --- | --- |
| 955,140 | G. E. Cronk | April 19, 1910 |
| 970,342 | A. Kurt | September 13, 1910 |
| 2,213,483 | V. A. Benson | September 3, 1940 |
| 2,839,043 | H. A. La Born | June 17, 1958 |
| 3,067,737 | L. H. Brown | December 11, 1962 |
| 3,537,388 | E. J. Martin | November 3, 1970 |
| 3,636,938 | E. J. Faltersack | January 25, 1972 |
| 3,785,360 | E. J. Martin | January 15, 1974 |

BACKGROUND AND SUMMARY OF THE INVENTION

This invention relates to a camper's grill, and more particularly to a portable camper's cooking apparatus of improved design.

The apparatus is of the pyramidal tripod type and contemplates utilization of a grill which hangs from the tripod apex and which is easily assembled and disassembled. One of the tripod legs is larger in diameter than the others and is adapted to storingly receive all of the components of the device. In addition, the said larger leg is formed at one end to have multi-functions, i.e. (1) it provides a guide for the grill hanging cable; (2) it provides a stop for the other tripod legs when the unit is assembled; and (3) it provides a stop to prevent fall-out of all the other components when they are stored therein. Furthermore, a wind guard is provided which selectively protects one lower side of the apparatus or alternately all three upper sides thereof.

BRIEF DESCRIPTION OF THE DRAWINGS

The accompanying drawings illustrate the best mode presently contemplated by the inventor for carrying out the invention.

In the drawings:

FIG. 1 is a side elevation of an assembled camper's grill constructed with the invention;

FIG. 2 is a top plan view of the assembled grill;

FIG. 3 is an enlarged fragmentary view taken on line 3—3 of FIG. 1, with parts broken away, and showing the tripod apex and grill cable locking mechanism;

FIG. 4 is a plan view taken on line 4—4 of FIG. 3;

FIG. 9 is a side elevation of a wind guard in fully open position;

FIG. 10 is a fragmentary perspective view of the lower tripod portion with the wind guard attached thereto;

FIG. 11 is a fragmentary perspective view of the upper tripod portion with the wind guard attached thereto;

FIG. 12 is a side elevation showing a drip pan complementing the grill;

FIG. 13 is a side elevation, with parts broken away, showing the entire apparatus stored in the large tripod leg; and FIG. 14 is a transverse section taken on line 14—14 of FIG. 13.

DESCRIPTION OF THE PREFERRED EMBODIMENT

Figure 5:
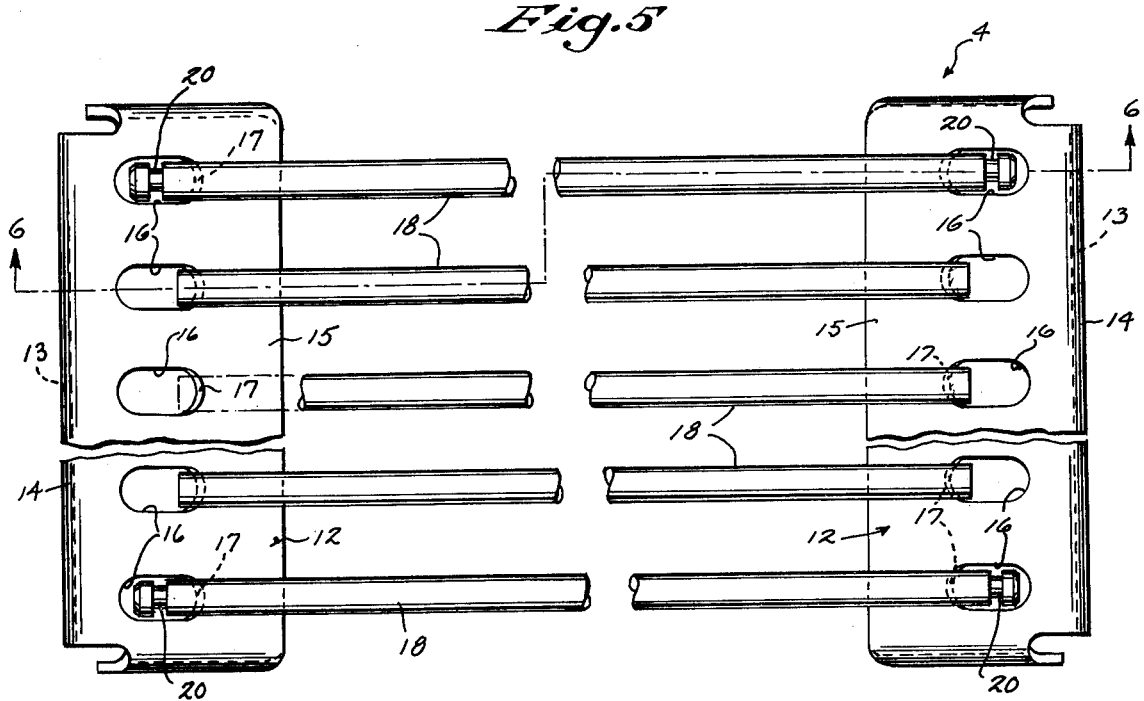
FIG. 5 is an enlarged top plan view of the grill assembly in partially assembled form.

As best shown in FIGS. 1 and 2 of the drawings, the tripod cooking device comprises a pair of elongated legs 1 of relatively small diameter, and a third leg 2 of relatively large diameter and which forms a hollow tube. The lower ends of each leg are adapted to engage a supporting surface, such as the ground 3. A grill assembly 4 is connected to corner mount cables 5, which merge into a single cable 6, with the latter passing over the tripod apex and terminating in a cable hook 7 of suitable bent design to lock the cable at any position along large leg 2. Grill assembly 4 may thus be selectively suspended at any desired height.

It is contemplated that the upper or apex end of leg 2 is formed in a unique manner to provide a multiplicity of functions. For this purpose, and as best shown in FIGS. 3 and 4, an edge portion of the upper leg end is bent radially inwardly to form a curved lip 8 forming a groove-like guide 9 over which grill cable 6 passes. The opposite edge of the end of leg 2 is shown as bent radially outwardly to also form a second cable guide 10. This construction eliminates the need for expensive and complicated pulleys, for it has been found that cable 6 will readily slide in the guides.

The basic tripod is assembled by passing the upper end portions of small legs 1 angularly through suitably positioned openings 11 in the walls of leg 2 adjacent the upper end of the latter, until the small leg ends engage curved lip 8. The latter thus also acts as a stop means to limit penetration of legs 1 into leg 2 and thereby stablilize the unit.

Grill assembly 4 is best illustrated in FIGS. 5-8. The assembly comprises a pair of longitudinally extending spaced generally inverted L-shaped elongated side channel members 12, with each member having a generally vertical outer flange 13 which merges through an upper curved portion 14 into an angularly downwardly inwardly extending flange 15. The latter flanges are provided with a plurality of longitudinally spaced transversely elongated slots 16, the lower inner edges 17 of which function as supports for grill rods 18.

Figure 6:
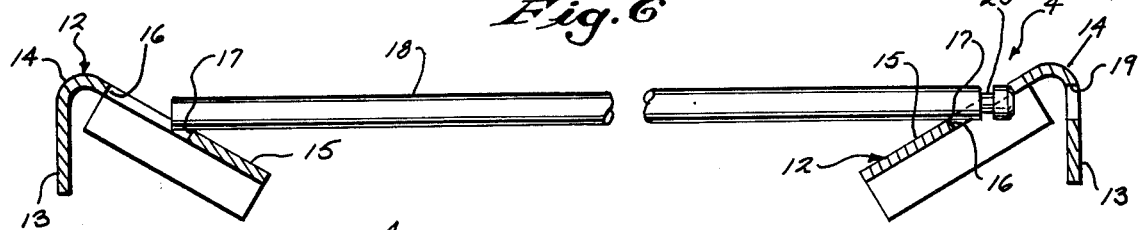
FIG. 6 is a horizontal section taken on line 6—6 of FIG. 5.

As shown in FIGS. 5 and 6, in assembling the grill, members 12 are positioned in parallel spaced-apart relationship. Rods 18 are then initially laid downwardly between members 12 so that the ends of each rod vertically enter opposed slots 16 and rest on edges 17. Because of the slots, the actual distance between members 12 may be somewhat varied or the rod lengths varied, but rods 18 will still enter the slots.

Figure 7:
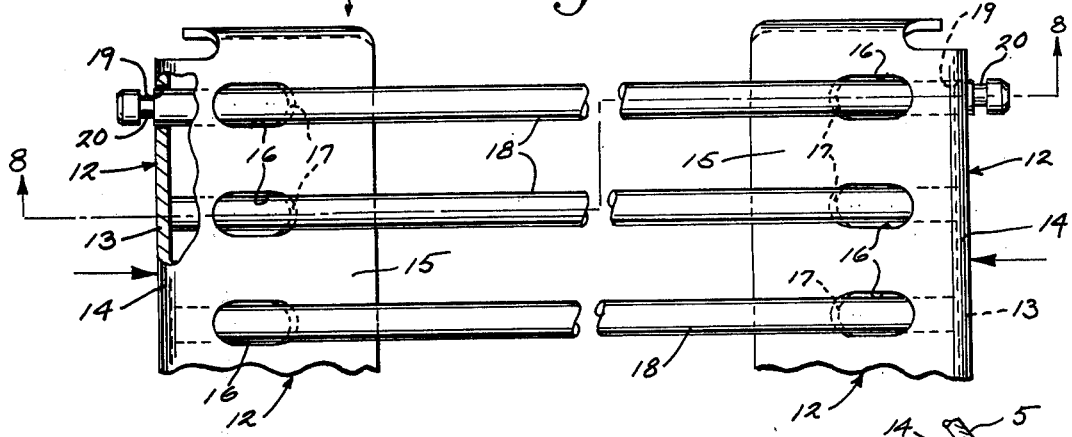
FIG. 7 is a fragmentary view similar to FIG. 5 and showing the fully assembled condition of the grill.
Figure 8:
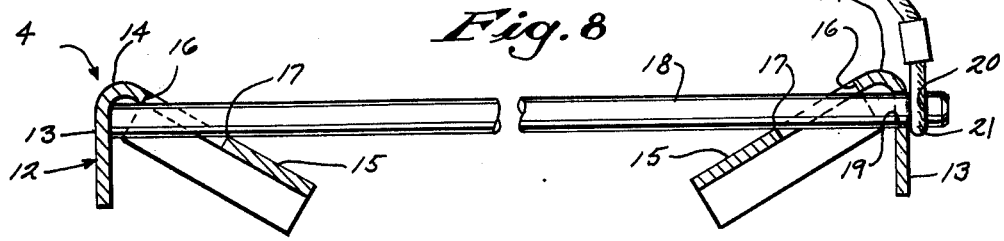
FIG. 8 is a horizontal section taken on line 8—8 of FIG. 7 and also showing the cable connection.

Referring to FIGS. 6 and 7, pressing of members 12 toward each other will cause the members to slide on the rods until the rod ends engage outer stop flanges 13 to create a stable rectangular grill. The rods are retained against vertical upward movement by the top edges of slots 16. In addition, the end rods 18 are of greater length than the other rods and are adapted to pass outwardly through openings 19 at each end of members 12. The extended ends of the end rods 18 are provided wih grooves 20 which receive support loops 21 disposed on the lower ends of cables 5. Not only do loops 21 hangingly support the grill in a four point suspension, but they also function as stop means to lock and prevent outward spreading of the grill assembly.

In some instances, it is desirable to protect grill assembly 4 from the wind during cooking. For this purpose, and as shown in FIGS. 9-11, a wind guard 22 of glass cloth or other suitable fire resistant material is provided. In the present embodiment, guard 22 is trapezoidal (FIG. 9) and may be suitably folded along seams 23. When it is desired to protect one lower side of the cooking apparatus, guard 22 is extended between the lower ends of two tripod legs (FIG. 10) and wrapped around them and secured in any suitable well-known way, such as by snaps, not shown. Guard 22 is dimensioned so that if it is desired to protect all sides of the apex portion of the tripod, it can be wrapped around all three sides between the legs (FIG. 11) and also secured in any suitable well-known way to retain heat and smoke.

At times, it may be desired to include a drip pan or other grill-like device beneath grill assembly 4. As shown in FIG. 12, a drip pan assembly 24 is disposed on the apparatus and may be generally similar to assembly 4, except for being larger so that its support cables 25 don't interfere with cables 5.

When the entire device is disassembled for transportation or storage, all of the elements thereof may be inserted into large tripod leg 2. For this purpose, the diameter of small legs 1 are such that the latter will fill less than half the diameter of tubular leg 2; and grill channel members 12, when placed in facing relationship with rods 18 between them, will fill the remaining portion of leg 2. See FIG. 14.

As shown in FIG. 13, the members are slid into leg 2 until legs 1 hit lip 8, which acts as an integral top at one end. A suitable holding cap 26 is placed on the opposite end of leg 2.

The tripod cooking device of the present invention is easy to assemble, disassemble and store; and is relatively inexpensive to manufacture.

Various modes of carrying out the invention are contemplated as being within the scope of the following claims particularly pointing out and distinctly claiming the subject matter which is regarded as the invention.

I claim:
1. In a tripod cooking device:
   a. a pair of legs,
   b. a third leg adapted for attachment with said pair of legs to form a pyramidal tripod and with said attachment being at the apex of said pyramid,
   c. a disassembleable cooking grill assembly,
   d. means to suspend said grill assembly from said apex,
   e. and means to lock said grill assembly in a selective vertical position,
   f. said third leg being tubular and being of such a diameter and length that said pair of legs, the disassembled grill assembly, the said suspension means and the said locking means are all containable within said third leg for storage thereof,
   g. the upper apex end of said third leg being formed to provide a guide for said grill assembly suspension means,
   h. the side wall of said third leg adjacent said apex having openings therein for passage of the upper ends of said pair of legs therethrough into the interior of said third leg,
   i. said formed guide portion of said third leg comprising stop means for the said upper ends of said pair of legs.
2. In a tripod cooking device:
   a. a pair of legs,
   b. a third leg adapted for attachment with said pair of legs to form a pyramidal tripod and with said attachment being at the apex of said pyramid,
   c. a disassembleable cooking grill assembly,
   d. means to suspend said grill assembly from said apex,
   e. and means to lock said grill assembly in a selective vertical position,
   f. said third leg being tubular and being of such a diameter that said pair of legs, the disassembled grill assembly, the said suspension means and the said locking means are all containable within said third leg for storage thereof,
   g. the upper apex end of said third leg being formed to provide a guide for said grill assembly suspension means,
   h. said formed guide portion of said third leg comprising an internal stop means for said pair of legs when they are storingly disposed within said third leg.
3. In a tripod cooking device:
   a. a pair of legs,
   b. a third leg adapted for attachment with said pair of legs to form a pyramidal tripod and with said attachment being at the apex of said pyramid,
   c. a cooking grill assembly,
   d. and suspension means for said grill assembly and with said suspension means passing over said apex,
   e. the upper apex end of said third leg being formed to provide a guide for said suspension means,
   f. the side wall of said third leg adjacent said apex having openings therein for passage of the upper ends of said pair of legs therethrough into the interior of said third leg,
   g. said formed guide portion of said third leg comprising stop means for the said upper ends of said pair of legs.
4. The tripod cooking device of claim 3 in which:
   a. said third leg is tubular and of such a diameter and length that it will contain said pair of legs,
   b. and said formed guide portion of said third leg comprises an internal top means for said pair of legs when they are contained within said third leg.
5. In a tripod cooking device:
   a. a pair of legs,
   b. a third leg adapted for attachment with said pair of legs to form a pyramidal tripod and with said attachment being at the apex of said pyramid,
   c. a cooking grill assembly,
   d. and suspension means for said grill assembly and with said suspension passing over said apex,
   e. the upper apex end of said third leg being formed to provide a guide for said suspension means,
   f. said third leg being tubular and of such diameter and length that it will contain said pair of legs,
   g. said formed guide portion of said third leg comprising an internal stop means for said pair of legs when they are contained within said third leg.
6. In a tripod cooking device:
   a. leg means attached to form a pyramidal tripod and with said attachment being at the apex of said pyramid,
   b. a cooking grill assembly, c. and means to suspend said grill assembly from said apex,
d. said grill assembly comprising:
1. a pair of longitudinally extending spaced parallel side members with each said member having a generally vertical outer flange and an angularly downwardly inwardly extending inner flange,
2. a plurality of grill rods adapted to extend between said side members,
3. and a plurality of longitudinally spaced transversely elongated slots disposed in said inner flanges, said slots comprising means for initially vertically receiving said rods when said side members are in a given spaced position,
4. the said outer flanges forming stop means for the ends of said rods, and the top edges of said slots forming retaining means for said rods, when said side members are subsequently pushed together.

7. The tripod cooking device of claim 6:
a. wherein the end rods of said plurality of rods extend outwardly through said outer flanges,
b. and means on the end portions of said end rods for connecting the latter to said grill assembly suspension means.

8. The tripod cooking device of claim 7 wherein said connecting means formed means to lock said side members to said grill rods.

* * * * *

UNITED STATES PATENT AND TRADEMARK OFFICE
CERTIFICATE OF CORRECTION

PATENT NO. : 4,024,851
DATED : May 24, 1977
INVENTOR(S) : Robert A. Boda

It is certified that error appears in the above-identified patent and that said Letters Patent are hereby corrected as shown below:

Column 1, Line 44, After "constructed" insert ---in accordance---

Column 4, Line 15, After "diameter" insert ---and length---

Column 4, Line 47, Delete "top" and substitute therefor ---stop---

Column 4, Line 56, After "suspension" insert ---means---

Column 6, Line 12, Delete "formed" and substitute therefor ---forms---

*Signed and Sealed this*

*Fourth* Day of *October 1977*

[SEAL]

Attest:

RUTH C. MASON
*Attesting Officer*

LUTRELLE F. PARKER
*Acting Commissioner of Patents and Trademark*